United States Patent
Joos

[11] 3,723,498
[45] Mar. 27, 1973

[54] PESTICIDAL 1-AMINO-1-MERCAPTO-2-CYANO-ETHENE DERIVATIVES

[76] Inventor: Alfred Joos, Frankfurter strasse 250, 61 Darmstadt, Germany

[22] Filed: June 17, 1969

[21] Appl. No.: 834,176

[30] Foreign Application Priority Data

June 24, 1968 Germany............P 17 68 784.2

[52] U.S. Cl. ..................260/465.4, 71/88, 71/94, 71/95, 71/97, 71/98, 260/247.1, 260/293.85, 260/326.84, 260/429.9, 260/430, 260/431, 260/438.1, 260/439, 260/465.5 R
[51] Int. Cl. .............................................C07c 121/30
[58] Field of Search......260/465.4, 465.5, 469.8, 464

[56] References Cited

UNITED STATES PATENTS

| | | | |
|---|---|---|---|
| 2,534,112 | 12/1950 | Edwards | 260/465.4 X |
| 3,013,018 | 12/1961 | Dickinson | 260/465.5 X |
| 3,226,423 | 12/1965 | Vest | 260/464 |
| 3,503,988 | 3/1970 | Laliberte | 260/465 X |
| 3,507,874 | 4/1970 | Laliberte | 260/465.4 X |
| 3,511,867 | 5/1970 | Laliberte et al. | 260/465.4 X |

*Primary Examiner*—Joseph P. Brust
*Attorney*—I. William Millen

[57] ABSTRACT

Pesticidal, e.g. herbicidal, fungicidal and/or defoliating, compounds are provided of the following formula:

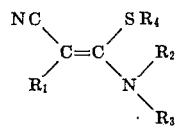

wherein
$R_1$ represents CN; $CONH_2$; $CONHCH_3$; or $COOR_2$,
$R_2$ and $R_3$ each represents hydrogen or alkyl of one to five carbon atoms, or together with the common N-atom, a piperidino, pyrrolidino or morpholine ring, and
$R_4$ is hydrogen, $NH_4^+$, an equivalent of a metal cation, or

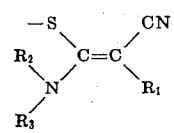

22 Claims, No Drawings

PESTICIDAL 1-AMINO-1-MERCAPTO-2-CYANO-ETHENE DERIVATIVES

This invention relates to 1-amino-1-mercapto-2-cyano-ethene derivatives and pesticidal compositions based thereon.

One object of this invention is to provide novel compounds and novel methods of producing the same as well as known compounds.

Another object is to provide pesticidal compositions exhibiting a variety of activities, e.g. herbicidal, fungicidal, defoliating, etc.

Upon further study of the specification and claims, other objects and advantages of the present invention will become apparent.

To attain these objects, there are provided ethene derivatives of Formula I

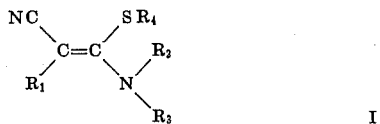

wherein $R_1$ represents CN; $CONH_2$; $CONHCH_3$; or $COOR_2$, $R_2$ and $R_3$ each represents hydrogen or alkyl of one to five carbon atoms, or together with the common N-atom, a piperidino, pyrrolidino or morpholino ring, and $R_4$ is hydrogen, $NH_4^+$, an equivalent of a metal cation, or

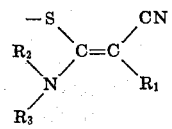

To produce these compounds, an ethene compound of Formula II

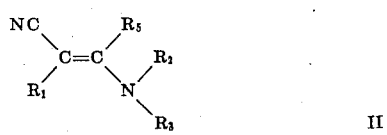

wherein $R_1$ to $R_3$ have the previously indicated meanings, and $R_5$ represents halogen or alkylthio of one to four carbon atoms, is reacted with alkali metal, alkaline earth metal or ammonium sulfides or hydrosulfides in an inert solvent at temperatures of between −20°C and +100°C. A thus-obtained mercaptan derivative can then be converted into a mercaptide of Formula I; or alternatively, a thus-produced mercaptide can be converted into the corresponding mercaptan by treatment with an acid. Both compounds can be converted into a disulfide of Formula I by treatment with an oxidizing agent.

In all compounds of formulas I and II, the substituent $-NR_2R$ can be in the cis- or trans-position with respect to $R_1$.

The compounds of Formula I are active pesticidal agents especially in plant treatment, preferably as fungicides, herbicides or defoliants. In particular, bis-(1-methylamino-2-cyano-2-aminocarbonyl-ethenyl)-disulfide shows a good herbicidal activity. Furthermore, nematocidal effects occur, f.e. in bis-(1-amino-2,2-dicyano-ethenyl)-disulfide.

The disulfides in particular of Formula I are usable as vulcanization accelerators when used in conventional amounts. The compounds of Formula I are also valuable intermediates for the preparation of other effective agents for pest control, or for plant treatment, particularly for the production of effective agents on the basis of thiocarboxylic acid amides and isothiazole derivatives. For instance, treatment of mercaptides of Formula I ($R_4$ = equivalent of a metal cation, preferably $Na^+$) with chlorine gives 3-chloro-4-$R_1$-5-$NR_2R_3$-isothiazoles such as 3-chloro-5-amino-4-isothiazolecarbonitrile or 3-chloro-5-amino-4-isothiazolecarboxamide which are described in U.S. Pat. No. 3,155,678 being useful as herbicides or intermediates for the manufacture of dyes and which can be used, furthermore, as intermediates for the manufacture of valuable insecticides and/or herbicides as described in copending application Ser. No. 628,569.

Referring now to the various R groups of Formula I, $R_1$, in addition to the residues CN, $CONHCH_3$, and $CONH_2$, includes the residues $COOR_2$ wherein $R_2$ is lower alkyl of up to five carbon atoms, e.g. $CH_3$, $C_2H_5$, n—$C_3H_7$, i—$C_3H_7$, n—$C_4H_9$, i—$C_4H_9$, tert.—$C_4H_9$,n—amyl or isoamyl, with methyl and ethyl being especially preferred. $R_2$ and $R_3$ can, in each case, be either identical or different but, of course, do not simultaneously represent groups which cannot form part of the same molecule because of steric hindrance, e.g. $R_2$ and $R_3$ do not simultaneously represent tert.—$C_4H_9$.

With respect to novel compounds per se, $R_1$ represents $COOR_2$ only when the compound of Formula I is a disulfide.

Among the mercaptides of Formula I ($R_4$ = equivalent of a metal cation or $NH_4^+$), especially important are the sodium, potassium, silver, zinc, mercury, iron and copper mercaptides.

Several of the preferred ethene compounds include, but are not limited to: 1-amino-1-mercapto-2,2-dicyano-ethene; 1-methylamino-1-mercapto-2,2-dicyano-ethene; 1-dimethylamino-1-mercapto-2,2-dicyano-ethene; 1-piperidino-1-mercapto-2,2-dicyano-ethene; 1-pyrrolidino-1-mercapto-2,2-dicyano-ethene; 1-morpholino-1-mercapto-2,2-dicyano-ethene; 1-mercapto-1-amino-2-cyano-2-aminocarbonyl-ethene; 1-methylamino-1-mercapto-2-cyano-2-aminocarbonylethene; 1-dimethylamino-1-mercapto-2-cyano-2-methyl-aminocarbonylethene; 1-amino-1-mercapto-2-cyano-2-carbethoxy-ethene; 1-methylamino-1-mercapto-2-cyano-2-carbethoxy-ethene; 1-dimethylamino-1-mercapto-2-cyano-2-carbethoxy-ethene; and 1-isopropylamino-1-mercapto-2-cyano-2-carbomethoxy-ethene. Of additional importance are the salts of these compounds, in particular the sodium, potassium, ammonium, silver, zinc, mercury, iron or copper mercaptides of these compounds.

Furthermore, the corresponding disulfides represent a preferred group, including, but not limited to, the following examples: bis-(1-amino-2,2-dicyano-ethenyl)-disulfide; bis-(1-methyl-amino-2,2-dicyano-ethenyl)-disulfide; bis-(1-dimethylamino-2,2-dicyano-ethenyl)-disulfide; bis-(1-piperidino-2,2-dicyanoethenyl)-disulfide; bis-(1-pyrrolidino-2,2-dicyano-ethenyl)-disulfide; bis-(1-morpholino-,2-dicyano-ethenyl)-disulfide; bis-(1-amino-2-cyano-2-aminocarbonyl-ethenyl)-disulfide; bis-(1-methylamino-2-cyano-2-aminocarbonyl-ethenyl)-disulfide; bis-(1-dimethylamino-2-cyano-2-aminocarbonyl-ethenyl)-disulfide; bis-(1-dimethylamino-2-cyano-2-methylaminocarbonyl-ethenyl)-disulfide; bis-(1-amino-2-cyano-2-carbethoxy-ethenyl)-disulfide; bis-(1-methylamino-2-cyano-2-carbethoxy-ethenyl)-disulfide; bis-(1-dimethylamino-2-cyano-2-carbethoxy-ethenyl)-disulfide; and bis-(1-isopropylamino-2-cyano-2-carbomethoxy-ethenyl)-disulfide.

The substituent $R_5$ in the starting materials of Formula II can be, in addition to halogen, lower alkylthio of up to four carbon atoms ($-S-CH_3$, $-S-C_2H_5$, $-S-n-C_3H_7$, $-S-i-C_3H_7$, $-S-n-C_4H_9$, $-S-i-C_4H_9$ or $-S-tert.-C_4H_9$), wherein the residue $-SCH_3$ is preferred. Among the halogen residues, Cl, Br and I are preferred.

It was surprising that the reaction of the compounds of Formula II with the sulfides or hydrosulfides takes place so smoothly and with such extraordinarily high yields. Such a reaction has not been known heretofore. It was actually expected that, under the reaction conditions employed, wherein perforce a very strongly basic reaction medium is produced, the CN-group(s) would be saponified. However, in actuality, no hydrolysis takes place; rather the mercaptans or mercaptides of Formula I are surprisingly obtained in an almost quantitative yield. Moreover, when starting with compounds II containing the residue $R_5$ = lower alkylthio, the process proceeds by way of a previously unknown thioether splitting step. That this thioether splitting reaction is conducted so smoothly is also surprising and has not been described heretofore in the literature.

When conducting the process, the starting materials II are suitably suspended or dissolved in an appropriate medium. For example, the starting compounds can be suspended in water, optionally with the addition of an organic solvent. Especially suitable organic solvents, in this connection are: lower alcohols, such as methanol, ethanol, isobutanol or polyhydric alcohols, especially lower di- or triols, such as glycol or glycerin, water-miscible ethers, such as tetrahydrofuran or dioxane, or dimethyl formamide.

In addition to the ammonium compounds, suitable alkali sulfides or hydrogen sulfides are, in particular, the Na- and K-compounds, while the preferred alkaline earth salts are the Ca- and Mg-sulfides or hydrogen sulfides.

The suspension or solution of the starting compounds is then combined with the sulfide or hydrosulfide. The sulfide or hydrosulfide is suitably employed in a molar ratio of 1 : 1 to 2 : 1, based on the starting compound. In general, the sulfide or hydrogen sulfide is utilized in the form of a solution, for example, in a 1–50 percent, especially aqueous, solution. For instance, a commercially available 33 percent sulfide solution can be employed. The reaction is generally terminated after a few minutes to about 10 hours at a temperature of between about −20°C and +100°C, preferably at about +20°C to +100°C, the reaction being acceleratable by agitation of the mixture. The reaction mixture is worked up in the usual manner.

If the starting compound is one of Formula II containing the residue $R_5$ = halogen (preferably Cl, Br or I), a mercaptan is obtained by reacting with a hydrosulfide. When reacting with sulfides, corresponding mercaptides are obtained. Likewise, starting materials of Formula II wherein $R_5$ = lower alkylthio yield mercaptides of Formula I.

If desired, the thus-obtained mercaptides can be converted into the free mercaptans of Formula I by adding an acid. Suitable acids are primarily: mineral acids, such as hydrochloric acid, hydrobromic acid, sulfuric acid, perchloric acid or phosphoric acid; or also organic acids, especially lower carboxylic acids, such as oxalic acid, formic acid, acetic acid, propionic acid or butyric acid. In place of an acid, it is also possible to employ acid salts, for example, acid sulfates, acid phosphates, acid oxalates or acid tartrates. Preferred are the strong mineral acids. The mercaptides can be subjected to the mineral acid by employing the latter, for example, in an approximately 10 percent solution.

A thus-obtained mercaptan I can, if desired, also be converted into a mercaptide in a conventional manner. Also, a mercaptide I can be converted into another mercaptide I. In this connection, for example, the preparation of heavy metal mercaptides is of importance, for example, copper, iron, silver, mercury or zinc mercaptides from mercaptans or other mercaptides of Formula I. Thus, it is possible to obtain heavy metal mercaptides, for example, in a simple manner by dissolving alkali or ammonium mercaptides of Formula I in a suitable solvent, e.g., in alcohols, and adding thereto a heavy metal salt, e.g., zinc acetate, which is likewise soluble in this solvent. The poorly soluble heavy metal mercaptide is precipitated from the solution and can be isolated in a simple manner, for example, by filtration.

In general, the readily soluble mercaptides, e.g., alkali or ammonium mercaptides, can be converted into the corresponding, poorly soluble heavy metal mercaptides I in a conventional manner, preferably by reaction with a corresponding heavy metal hydroxide suitable for the salt formation, or with heavy metal salts of weak acids, for example, with acetates such as copper(I)- or silver acetate, or carbonates or citrates, or with iron, zinc or mercury acetates, carbonates or citrates. Another suitable example is ferroammonium sulfate. In place of heavy metal salts of weak acids, it is also possible to employ the metal salts of strong acids, together with a buffer salt. Thus, for example, copper mercaptides of Formula I can be produced from the corresponding mercaptans or readily soluble mercaptides I by reaction with copper sulfate in the presence of sodium acetate. Correspondingly, $HgCl_2$ can be used in the presence of sodium acetate.

The mercaptans or mercaptides of Formula I can also be converted into the corresponding disulfides by treatment with an oxidizing agent. In these disulfides, $R_4$ represents

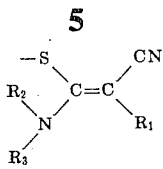

For this oxidation reaction, all oxidizing agents can be employed which are conventionally employed for the preparation of disulfides from mercaptans or mercaptides. Especially suitable for this reaction are the following oxidizing agents: air in an alkaline or ammoniacal solution, optionally with the use of iron salts or copper salts as catalysts; $H_2O_2$ in an acidic or ammoniacal solution, optionally together with iron salts as the catalyst; halogens, especially chlorine, bromine, or iodine, preferably in water or organic solvents, such as glacial acetic acid or acetonitrile; alkali hypohalogenites, e.g., sodium hypochlorite; $FeCl_3$ in an aqueous solution; $K_3Fe(CN)_6$ in an aqueous solution; nitric oxide in an alkaline solution; peracids, or the salts thereof, such as ammonium persulfate; permanganates; and nitric acid.

The starting materials II are, for the greater part, known or otherwise can be prepared in accordance with conventional methods known from the literature. Particularly relevant in this respect is South African Pat. No. 66/5910 and the literature cited therein.

When the mercapto compounds of Formula I are oxidized to disulfides, it is not necessary to isolate the former. Rather, the reaction solution obtained, containing the mercaptan, can be directly subjected to the oxidation process.

The novel compounds of this invention can be employed as effective agents in combatting plant pests. They can be employed as fungicide in the open fields, or also in seed-dressing agents. Furthermore, the compounds are also effective as herbicides, in certain cases also as defoliants, e.g., for defoliating cotton. In this connection, they can also be combined, in a conventional manner, with other, known effective agents.

The ethene derivatives of the present invention can be processed into all forms of application conventional for pest control or plant treatment. With the addition of the conventional carriers and/or additives, it is possible, for example, to produce spraying or dusting compositions, as well as dressing compositions for the preservation of seed. These compositions usually contain further additives, such as dispersing and/or wetting agents. When appropriate additives are employed, it is also possible to work the substances into solutions or emulsions which can, for example, also be sprayed as aerosols, with the usual propellant gases being employed. A preferred composition comprises active agent, surface active agent and pulverulent solids.

Emulsion concentrates can be made available commercially as such; before use, the emulsion concentrates are diluted with water in the usual manner. In case compositions are employed containing, as the effective-agent components, one or more water-soluble substances, it is, of course, also feasible to employ water as the solvent or diluent for producing the concentrate.

The total content of active agent in the compositions to be applied to plants ranges generally between 0.1 and 95 percent, preferably between 20 and 80 percent. In combination preparations, the proportion of the products of this process in the total proportion of effective agent normally ranges between 0.1 and 90 percent, preferably between 10 and 60 percent.

The rate of application is — in dependence on the effect desired, the climatic conditions, and the type and character of the plants to be treated — between 1 and 100 kg/ha, preferably between 3 and 20 kg/ha [1 hectare being 2.471 acres].

Compounds of Formula I in which $R_1$ represents COOalkyl, $R_2$ and $R_3$ represent alkyl or, together, alkylene, and $R_4$ represents H are described in German Pat. No. 1,237,105.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

I. PREPARATION OF THE COMPOUNDS

EXAMPLE 1

139 g. (= 1 mol) of 1-amino-1-methylmercapto-2,2-dicyano-ethene is suspended in 4 l. of water. Then 169 g. of 33 percent sodium hydrogen sulfide solution is added, and after the reaction solution is heated under agitation for 4 hours to 80°–85°C, the solution is concentrated under reduced pressure at 80°C to about 1 liter, and then cooled to 20°C. In case the solution does not remain clear, it is subjected to filtration, and the filtrate is evaporated to dryness at about 80°C under a vacuum. As the residue, 136 g. (92.5 percent of theory) of 1-amino-1-sodium-mercapto-2,2-dicyano-ethene remain in the form of white, hygroscopic crystals which do not melt until a temperature of 300°C is reached. The corresponding 1-amino-1-mercapto-2,2-dicyanoethene, liberated by means of hydrochloric acid, melts at 170°–172°C.

Analogously, the following mercaptides or mercaptans are obtained:

a. 1-Methylamino-1-mercapto-2,2-dicyano-ethene, m.p. 165°C.

b. 1-Dimethylamino-1-mercapto-2,2-dicyano-ethene, m.p. 157°–160°C.

c. 1-Piperidino-1-mercapto-2,2-dicyano-ethene, Analysis:

|  | C | H | N | S |
|---|---|---|---|---|
| Calculated: | 55.9 | 5.7 | 21.8 | 16.5 |
| Found: | 55.1 | 6.1 | 20.9 | 17.2 | d. 1-Pyrrolidino-1-mercapto-2,2-dicyano-ethene, Analysis:

|  | C | H | N | S |
|---|---|---|---|---|
| Calculated: | 53.6 | 5.0 | 23.4 | 17.9 |
| Found: | 52.8 | 5.9 | 22.9 | 1.82 | e. 1-Morpholino-1-mercapto-2,2-dicyano-ethene, Analysis:

|  | C | H | N | S |
|---|---|---|---|---|
| Calculated: | 49.2 | 4.6 | 21.5 | 16.4 |

Found: 50.2 5.2 20.3 15.9 f. 1-Methylamino-1-sodium-mercapto-2,2-dicyano-ethene, Analysis:

|  | C | H | N | Na |
|---|---|---|---|---|
| Calculated: | 37.1 | 2.5 | 25.1 | 14.3 |
| Found: | 36.7 | 2.9 | 24.5 | 15.1 |

EXAMPLE 2

Analogously to Example 1, 186.2 g. (1 mol) of 1-amino-1-methyl-mercapto-2-cyano-2-carbethoxy-ethene, is reacted with 169 g. of a 33 percent solution of sodium hydrogen sulfide to obtain 1-amino-1-sodium-mercapto-2-cyano-2-carbethoxy-ethene in the form of white, hygroscopic crystals which do not melt until 310°C. By treatment with sulfuric acid, 1-amino-1-mercapto-2-cyano-2-carbethoxy-ethene is obtained, m.p. 155°–156°C.

In place of the sodium hydrogen sulfide, it is possible to employ, with the same success, potassium, ammonium, calcium or magnesium hydrogen sulfide. The reaction can also be conducted with the corresponding sulfides.

Analogously, the following compounds are obtained:

a. 1-Methylamino-1-sodium-mercapto-2-cyano-2-carbethoxy-ethene, Analysis:

|  | C | H | N | Na |
|---|---|---|---|---|
| Calculated: | 40.6 | 4.4 | 13.5 | 11.1 |
| Found: | 39.8 | 4.5 | 13.2 | 11.4 | b. 1-Methylamino-1-mercapto-2-cyano-2-carbethoxy-ethene, m.p. 58°C.

c. 1-Dimethylamino-1-sodium-mercapto-2-cyano-2-carbethoxy-ethene, Analysis:

|  | C | H | N | Na |
|---|---|---|---|---|
| Calculated: | 43.2 | 4.9 | 12.6 | 10.4 |
| Found: | 41.8 | 4.6 | 12.9 | 9.7 | d. 1-Dimethylamino-1-mercapto-2-cyano-2-carbethoxyethene, m.p. 53°–54°C.

e. 1-Isopropylamino-1-sodium-mercapto-2-cyano-2-carbomethoxy-ethene, Analysis:

|  | C | H | N | Na |
|---|---|---|---|---|
| Calculated: | 43.2 | 4.9 | 12.6 | 10.4 |
| Found: | 41.8 | 4.6 | 12.9 | 9.7 | f. 1-Dimethylamino-1-mercapto-2-cyano-2-methyl-aminocarbonyl-ethene, m.p. 144°–146°C.

g. 1-Amino-1-mercapto-2-cyano-2-aminocarbonylethene, m.p. 162°C (decomposition).

h. 1-Dimethylamino-1-mercapto-2-cyano-2-aminocarbonyl-ethene, m.p. 147°C (decomposition).

i. 1-Morpholino-1-mercapto-2-cyano-2-carbethoxyethene, m.p. 74°–76°C.

EXAMPLE 3

24.6 g. of sodium acetate (0.3 mol) is added to a solution of 16.1 g. of 1-methylamino-1-sodium-mercapto-2,2-dicyano-ethene (0.1 mol) in 400 ml of water; thereafter, a solution of 16.9 g. of silver nitrate in 100 ml of water is added dropwise under stirring at room temperature. The stirring is continued for 1 hour, and the resultant 1-methylamino-1-silver-mercapto-2,2-dicyano-ethene is then filtered off. Yield: 89 percent. The salt is discolored to a dark shade when heated to temperatures above 260°C.

Correspondingly, the following silver mercaptides are prepared from the sodium salts, all assuming a dark color when heated to temperatures between 250° and 300°C:

1-amino-1-silver-mercapto-2,2-dicyano-ethene
1-isopropylamino-1-silver-mercapto-2,2-dicyano-ethene
1-morpholino-1-silver-mercapto-2,2-dicyano-ethene
1-dimethylamino-1-silver-mercapto-2-cyano-2-methyl-aminocarbonyl-ethene
1-n-butylamino-1-silver-mercapto-2-cyano-2-amino-carbonyl-ethene.

EXAMPLE 4

5 g. 1-amino-1-mercapto-2,2-dicyano-ethene is dissolved at 80°C in 200 ml of 25 percent ethanol and mixed, under agitation, with a solution of 4 g. of copper(II)-acetate in 50 ml of water. The yellow-green copper salt is at once separated and, after stirring for ½ hour and being cooled to room temperature, is vacuum-filtered and then washed first with water and thereafter with acetone. Yield: 4.7 g. = 78.5 percent of theory; m.p. above 310°C.

| Analysis: | C | H | Cu |
|---|---|---|---|
| Calculated: | 30.85 | 1.3 | 20.4 |
| Found: | 30.20 | 1.6 | 20.6 |

Correspondingly, the following copper salts are produced, all of which have a melting point of 310°C or above.

1-dimethylamino-1-copper-mercapto-2,2-dicyano-ethene
1-n-propylamino-1-copper-mercapto-2-cyano-2-amino-carbonyl-ethene
1-n-butylamino-1-copper-mercapto-2-cyano-2-carbo-methoxy-ethene
1-amino-1-copper-mercapto-2-cyano-2-aminocarbonyl-ethene.

EXAMPLE 5

Analogously to Example 4, with the use of zinc(II)-acetate acetate instead of copper(II( )-acetate, the corresponding zinc salt of 1-amino-1-mercapto-2,2-dicyano-ethene is obtained as a white, practically insoluble powder which does not melt until 310°C.

| Analysis: | C | H | Zn |
|---|---|---|---|
| Calculated: | 30.7 | 1.3 | 20.8 |
| Found: | 29.2 | 1.5 | 22.1 |

Correspondingly, the following compounds are obtained:

1-amino-1-zinc-mercapto-2,2-dicyano-ethene
1-isopropylamino-1-zinc-mercapto-2,2-dicyano-ethene
1-morpholino-1-zinc-mercapto-2,2-dicyano-ethene
1-dimethylamino-1-zinc-mercapto-2-cyano-2-methylaminocarbonyl-ethene
1-n-butylamino-1-zinc-mercapto-2-cyano-2-aminocarbonyl-ethene.

EXAMPLE 6

A solution of 2.94 kg of 1-amino-1-sodium-mercapto-2,2-dicyano-ethene in 90 l. of water is mixed under agitation with 2.2 kg of concentrated hydrochloric acid and at 20°C, 1.23 l. of 30 percent hydrogen peroxide is admixed therewith during a period of 5 minutes. The disulfide quickly begins to separate in the form of fine, white crystals. The agitation is continued for another half hour; then the reaction mixture is vacuum-filtered and washed with a large amount of water. After drying, 2.29 kg (= 92.4 percent of theory) of bis-(1-amino-2,2-dicyano-ethenyl)-disulfide is obtained, which product starts, without previous melting, to decompose at 180°C while assuming a red color.

Analogously, the following compounds are obtained:
bis-(1-amino-2-cyano-2-carbethoxy-ethenyl)-disulfide, m.p. 184°–186°C;
bis-(1-methylamino-2-cyano-2-carbethoxy-ethenyl)-disulfide, m.p. 166°–168°C;
bis-(1-dimethylamino-2-cyano-2-carbethoxy-ethenyl)-disulfide, m.p. 136°–138°C;
bis-(1-ethylamino-2,2-dicyano-ethenyl)-disulfide, m.p. 137°–139°C;
bis-(1-methylamino-2,2-dicyano-ethenyl)-disulfide, decomposition from 130°C, red coloring.

EXAMPLE 7

110 g. of 1-mercapto-1-dimethylamino-2-cyano-2-methylaminocarbonyl-ethene is suspended in 1,100 ml of acetonitrile and 55 ml of dimethyl formamide. Under agitation, chlorine is introduced into the suspension at room temperature and at a rate such that the temperature, after 5 minutes, is increased to 50°C. From the presently clear solution, crystals separate during cooling, which crystals are vacuum-filtered and washed with a small amount of ice-cold acetonitrile. After drying, the desired bis-(1-dimethylamino-2-cyano-2-methylaminocarbonylethenyl)-disulfide is obtained in the form of yellow-white crystals having a melting point of 214°–215°C.

EXAMPLE 8

A solution of 19.5 g. of $Na_2S$ in 400 ml of methanol is added dropwise at the boiling point in the course of 10 minutes to a solution of 50.5 g. of 1-chloro-1-isopropylamino-2-cyano-2-carbomethoxy-ethene, m.p. 77°C, in 400 ml of methanol. Then, the mixture is boiled under reflux for 30 minutes. After cooling, the separated NaCl is filtered off. Subsequently, the solution is concentrated to dryness under vacuum; the residue (1-isopropylamino-1-sodium-mercapto-2-cyano-2-carbomethoxyethene) is dissolved in water and thereupon acidified to a pH of 4 with dilute sulfuric acid. The thus-obtained solution is mixed, under stirring, with 14 ml of 30 percent hydrogen peroxide. After several hours of agitation, bis-(1-isopropylamino-2-carbomethoxy-2-cyano-ethenyl)-disulfide precipitates in crystalline form, m.p. 133°–134°C.

In place of the 1-chloroethene compounds, the corresponding 1-bromo- or 1-iodo-compound can likewise be employed. However, since these compounds are substantially more reactive, but also less stable, the reaction with sulfides or hydrogen sulfides is suitably conducted at lower temperatures (between −20° and +20°C).

Analogously, the following compounds are produced:
a. Bis-(1-methylamino-2-cyano-2-methylaminocarbonyl-ethenyl)-disulfide, which sinters starting at 150°C and decomposes at 193°C.
b. Bis-(1-dimethylamino-2-cyano-2-aminocarbonyl-ethenyl)-disulfide, m.p. 140°–145°C.
c. Bis-(1-methylamino-2-cyano-2-aminocarbonyl-ethenyl)-disulfide, m.p. 166°C (decomposition).
d. Bis-(1-amino-2-cyano-2-aminocarbonyl-ethenyl)-disulfide, m.p. 170°C (decomposition).
e. Bis-(1-morpholino-2,2-dicyano-ethenyl)-disulfide, m.p. 171°–173°C.
f. Bis-(1-piperidino-2,2-dicyano-ethenyl)-disulfide, m.p. 205°–207°C.
g. Bis-(1-pyrrolidino-2,2-dicyano-ethenyl)-disulfide, m.p. 187°–189°C.
h. Bis-(1-dimethylamino-2,2-dicyano-ethenyl)-disulfide, decomposition from 260°C.

II. PESTICIDAL COMPOSITIONS

EXAMPLE A

Sprayable Powder
50% 1-Methylamino-1-mercapto-2,2-dicyano-ethene
0.5% Alkyl naphthalene sulfonate
1% silicic acid
48.5% Bole

EXAMPLE B

Granulate
5% 1-Morpholino-1-mercapto-2,2-dicyano-ethene copper or zinc salt
3% Gelatin
10% Bole
5% Wheat flour
77% Bran

EXAMPLE C

Sprayable Powder
75% Bis-(1-dimethylamino-2-cyano-2-aminocarbonylethenyl)-disulfide
8% Oleic acid-N-methyl tauride
17% Chalk

EXAMPLE D

Sprayable Powder
80% 1-Amino-1-zinc-mercapto-2-cyano-2-carbethoxyethene
5% Oleic acid-N-methyl tauride
15% Siliceous chalk The components are finely ground together. By dilution with water, a finely divided emulsion is obtained which can be sprayed or atomized.

EXAMPLE E

Dispersion
25% Bis-(1-methylamino-2-cyano-2-aminocarbonylethenyl)-disulfide
3% Emulsifier mixture (calcium dodecyl benzenesulfonate and polyoxyethylene sorbitan esters of a mixture of fatty and resinic acids)
1.5% Carboxymethylcellulose
1.5% Bentonite
69% water In place of the aforesaid disulfide, it is also possible to employ 1-dimethylamino-1-mercapto-2,2-dicyanoethene.

EXAMPLE F

Sprayable Powder
- 50% Bis-(1-methylamino-2-cyano-methylaminocarbonyl-ethenyl)-disulfide
- 0.5% Dialkyl naphthalene sulfate
- 10% Sulfite waste liquor powder
- 39.5% Bole As the active ingredient, it is also possible to utilize bis-(1-methylamino-2,2-dicyano-ethenyl)-disulfide.

EXAMPLE G

Granulate
- 8% 1-Amino-1-copper-mercapto-2,2-dicyanoethene
- 3% Gelatin
- 80% Bran
- 9% Bole

EXAMPLE H

Dusting Agent
- 2% Bis-(1-methylamino-2-cyano-1-carbethoxyethenyl)-disulfide and
- 98% Talc are ground together and thereafter distributed by dusting.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

The embodiments of the invention in which an exclusive property or privilege is claimed are defined as follows:

1. A compound of the Formula

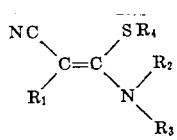

wherein
  $R_1$ is CN or $COOR_2$,
  $R_2$ and $R_3$ each is hydrogen or alkyl of one to five carbon atoms, and
  $R_4$ is hydrogen, $NH_4^+$, or

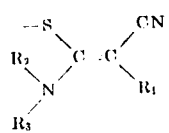

with the provision that when $R_4$ is hydrogen, or $NH_4^+$, $R_1$ does not represent $COOR_2$.

2. A compound as defined by claim 1 wherein $R_4$ is $NH_4^+$.

3. A compound as defined by claim 1 wherein $R_4$ is

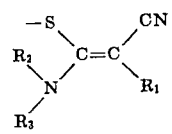

4. A compound as defined by claim 1 wherein said compound is 1-amino-1-mercapto-2,2-dicyano-ethene.

5. A compound as defined by claim 1 wherein said compound is 1-methylamino-1-mercapto-2,2-dicyanoethene.

6. A compound as defined by claim 1 wherein said compound is 1-dimethylamino-1-mercapto-2,2-dicyano-ethene.

7. A compound as defined by claim 1 wherein said compound is bis-(1-amino-2,2-dicyano-ethenyl)-disulfide.

8. A compound as defined by claim 1 wherein said compound is bis-(1-methylamino-2,2-dicyano-ethenyl)-disulfide.

9. A compound as defined by claim 1 wherein said compound is bis-(1-dimethylamino-2,2-dicyano-ethenyl)-disulfide.

10. A compound as defined by claim 1 wherein said compound is bis-(1-amino-2-cyano-2-carbethoxy-ethenyl)-disulfide.

11. A compound as defined by claim 1 wherein said compound is bis-(1-methylamino-2-cyano-2-carbethoxy-ethenyl)-disulfide.

12. A compound as defined by claim 1 wherein said compound is bis-(1-dimethylamino-2-cyano-2-carbethoxy-ethenyl)-disulfide.

13. A compound as defined by claim 1, wherein $R_2$ and $R_3$ each is alkyl of one to five carbon atoms.

14. A compound as defined by claim 1, wherein $R_2$ and $R_3$ each is hydrogen.

15. A compound as defined by claim 3, wherein $R_2$ and $R_3$ each is alkyl of one to five carbon atoms.

16. A compound as defined by claim 3, wherein $R_2$ and $R_3$ each is hydrogen.

17. A process for the preparation of a compound of the formula

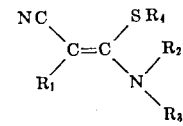

wherein
  $R_1$ represents CN; $CONH_2$; $CONHCH_3$; or $COOR_2$,
  $R_2$ and $R_3$ each represents hydrogen or alkyl of one to five carbon atoms, and
  $R_4$ represents hydrogen, $NH_4^+$, or an equivalent of a metal cation, said process comprising reacting a starting material of the formula

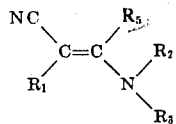

wherein
$R_1$ to $R_3$ having the previously indicated meanings, and
$R_5$ represents halogen or lower alkylthio, with an alkali metal, an alkaline earth metal or ammonium sulfide or hydrosulfide in an inert solvent at temperatures of between $-20°C$ and $+100°C$.

18. A process as defined by claim 17, wherein $R_1$ is CN.

19. A process as defined by claim 18, wherein $R_2$ and $R_3$ each is alkyl of one to five carbon atoms.

20. A process as defined by claim 18, wherein $R_2$ and $R_3$ each is hydrogen.

21. A process as defined by claim 17 further comprising the step of oxidizing said compound produced therein to form the corresponding disulfide.

22. A process as defined by claim 17 wherein said halogen is Cl, Br or I.

* * * * *